H. Gerner,
Furnace-Grate Bar.

Nº 44,622. Patented Oct. 11, 1864.

Witnesses:
J. P. Hall.
Wm. P. McNamara

Inventor:
Henry Gerner

UNITED STATES PATENT OFFICE.

HENRY GERNER, OF NEW YORK, N. Y.

IMPROVEMENT IN FURNACE-GRATE BARS.

Specification forming part of Letters Patent No. 44,622, dated October 11, 1864.

*To all whom it may concern:*

Be it known that I, HENRY GERNER, of the city, county, and State of New York, have invented a new and Improved Furnace-Grate Bar; and I do hereby declare that the following is a full, clear, and exact description thereof, which will enable others skilled in the art to make and use the same, reference being had to the accompanying drawings, forming part of this specification, in which—

Figure 1:
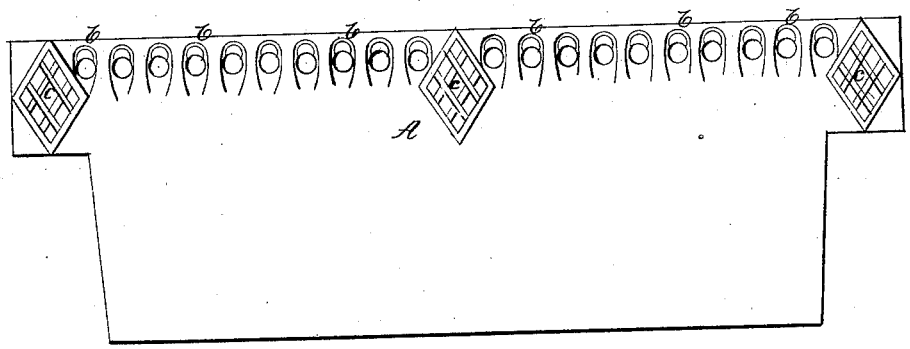
Figure 2:
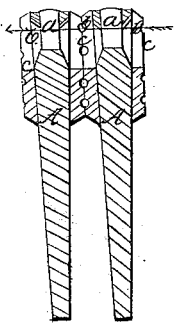

Figure 1 represents a side elevation of my invention. Fig. 2 is a transverse vertical section of the same.

Similar letters of reference indicate like parts.

This invention consists in the arrangement of a groove, extending in a longitudinal direction through the entire upper edge of a grate-bar, which is provided with holes passing transversely through the same near the bottom of the groove in such a manner that by the ashes accumulating in said groove and by the current of air passing through the transverse holes and through the ashes in the groove the upper edge of the grate-bar is kept comparatively cool and the burning out of the same is obviated or prevented.

The invention consists, also, in the application to the sides of each grate-bar of diamond-shaped corrugated projections, which, by reason of their corrugations, allow the air to pass through between them, and by their peculiar shape prevent the ashes from lodging on their edge, so that the fire can be always kept clean and the draft is not interrupted.

A represents a grate-bar, cast of iron or made of any other suitable material. The form of my grate-bar is peculiar. It is made thin and wide, so that its width makes up for the reduction in its thickness, and it is tapering off toward the bottom edge very little, so that the expansion of all parts of the bar is equal and a warping of the same is prevented.

The upper edge of my bar is provided with a groove, $a$, extending from one end to the other, and about one-half an inch deep, (more or less,) according to the size of the bar, and a series of holes, $b$, leads from this groove to both sides, as clearly shown in the drawings.

When the bar is used in a furnace, the groove $a$ soon fills with ashes, and by the air passing transversely through the holes $b$ and through the ashes in the groove the upper edge of the bar is kept comparatively cool, and the burning out of the same is prevented. By this simple improvement I am enabled to produce grate-bars which last much longer than grate-bars of the usual construction.

Each of my bars is provided with three (more or less) diamond-shaped corrugated projections, $c$, on its sides, as clearly shown in Fig. 1 of the drawings. The sharp points of the diamonds are turned upward, so that the ashes are prevented from lodging thereon and from stopping up the draft between the bars. The corrugations in the projections allow the air to pass through between them, and the draft is thus very little interrupted.

I am aware that most all grate-bars are provided with projections of some kind to keep them separate one from the other, but these projections are generally made square and flat on top, and they afford room for the ashes to lodge on and prevent the free passage of the air up to the fire. My diamond-shaped projections allow the air to pass up freely, and no room is afforded on which the ashes might accumulate.

I claim as new and desire to secure by Letters Patent—

1. The groove $a$, extending in a longitudinal direction throughout the upper edge of the grate-bar A, in combination with the transverse holes $b$, constructed and operating substantially as and for the purpose set forth.

2. In combination with the aforesaid groove $a$ and holes $b\ b$, the diamond-shaped corrugated projections $c\ c$, constructed and operating as specified.

HENRY GERNER.

Witnesses:
J. P. HALL,
WM. F. MCNAMARA.